(12) United States Patent
Tonami

(10) Patent No.: US 7,619,793 B2
(45) Date of Patent: Nov. 17, 2009

(54) MOIRE REDUCTION APPARATUS, METHOD, AND COMPUTER PRODUCT

(75) Inventor: Kazunari Tonami, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 756 days.

(21) Appl. No.: 11/080,802

(22) Filed: Mar. 14, 2005

(65) Prior Publication Data
US 2005/0206930 A1 Sep. 22, 2005

(30) Foreign Application Priority Data
Mar. 18, 2004 (JP) ............................. 2004-079257
Nov. 4, 2004 (JP) ............................. 2004-320885

(51) Int. Cl.
*H04N 1/46* (2006.01)
*H04N 1/60* (2006.01)
*H04N 1/407* (2006.01)
*H04N 1/409* (2006.01)
*G06T 5/00* (2006.01)
*G06F 15/00* (2006.01)
*G06K 1/00* (2006.01)

(52) U.S. Cl. ..................... 358/533; 358/1.9; 358/536; 358/3.26

(58) Field of Classification Search ................. 358/533, 358/500, 1.9, 1.1
See application file for complete search history.

(56) References Cited

U.S. PATENT DOCUMENTS 5,173,788 A * 12/1992 Ohta ......................... 382/264
5,247,883 A * 9/1993 Kuwahara et al. ........... 101/170
6,027,196 A * 2/2000 Gotoh et al. ................. 347/7
2002/0080377 A1 6/2002 Tonami et al.
2004/0109184 A1* 6/2004 Ishii .......................... 358/1.9

FOREIGN PATENT DOCUMENTS

JP 08-171252 A 7/1996
JP 10-157167 6/1998
JP 2002-031949 A 1/2002

OTHER PUBLICATIONS

U.S. Appl. No. 10/666,246, filed Jul. 01, 2004, Kazunari Tonami.
U.S. Appl. No. 10/825,797, filed Sep. 15, 2004, Hiroyuki Shibaki.
U.S. Appl. No. 10/821,612, filed Dec. 23, 2004, Kazunari Tonami.
U.S. Appl. No. 09/695,992, filed Oct. 26, 2000, Hiroshi Takahashi et al.
U.S. Appl. No. 09/722,270, filed Jun. 27, 2002, Tonami et al.

* cited by examiner

*Primary Examiner*—Mark K Zimmerman
*Assistant Examiner*—Ming Hon
(74) *Attorney, Agent, or Firm*—Blakely, Sokoloff, Taylor & Zafman LLP

(57) ABSTRACT

An image forming apparatus has a color converter, a BG/UCR processor, a Bk/Lk generator, and a halftone processor. The cyan, the black, and the magenta are halftone screens having substantially equal frequencies and angle differences therebetween each set at approximately 30 degree. The light black is a halftone screen, and the light black and the black have a frequency ratio of 1.0 to 1.2, which is the ratio of the higher one of the frequencies of the light black and the black to the lower one thereof, and have the angle difference of approximately 45 degrees.

15 Claims, 4 Drawing Sheets

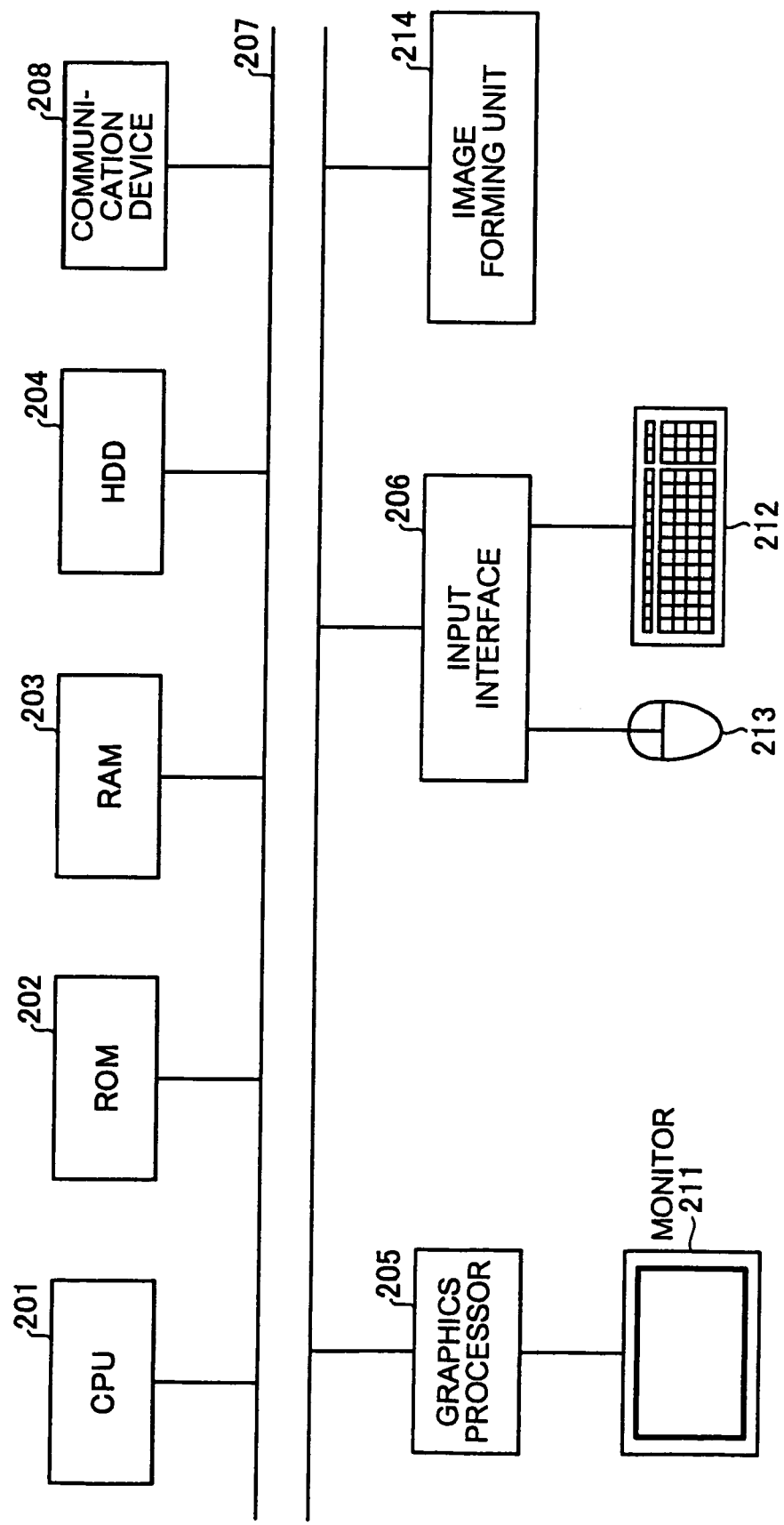

MOIRE REDUCTION APPARATUS, METHOD, AND COMPUTER PRODUCT

The present document incorporates by reference the entire contents of and claims priority to Japanese priority document, 2004-079257 filed in Japan on Mar. 18, 2004 and 2004-320885 filed in Japan on Nov. 4, 2004.

BACKGROUND OF THE INVENTION

1. Field of the Invention

The present invention relates to technology for forming images.

2. Description of the Related Art

There have been proposed and developed image forming apparatuses of an electrophotographic type and an ink-jet type, which form finer images using toners or inks of five or more colors. Japanese Patent Application Laid-Open Nos. 2002-31949 and H8-171252 disclose such image forming apparatuses. These image forming apparatuses use a dark toner and a light toner to improve the granularity at a portion in the image where the density is low.

Some other publications teach forming images using a dark ink and a light ink to improve the granularity at a portion in the image where the density is low. Such a technology has been disclosed in Japanese Patent Publication No. 3292104.

Such image forming apparatuses record data in a binary form of dots being ON/OFF or in several gray scales using dots of an intermediate size. One approach to perform such a recording is to perform halftone processing on each piece of color data of the input image data to convert the number of gray scales of input image data to the number of recording gray scales of the image forming apparatus. Dithering is one of the types of the halftone processing. When dithering is performed, an image having a periodicity, such as a halftone screen or a line screen, is formed. The halftone screen expresses darkness or lightness by the size of a halftone, while the line screen expresses darkness or lightness by the width of a line.

An image forming apparatus that records data in four colors of cyan, magenta, yellow, and black (CMYK) generally uses different screens for individual colors to suppress a moire generated by periodical overlapping of individual colors. To suppress a moire originated from overlapping of halftone screens of three planes, it is generally desirable to lay out the screens at angles of 30 degree when the frequencies of halftones (the numbers of lines) are the same. Three planes of CMK are often laid out at intervals of 30 degree, with the Y plane, hardest to be observed, being laid out at an intermediate screen angle. For a line screen, it is possible to suppress a moire by arranging the three CMK planes at intervals of 60 degree.

Since the screen angle and the frequency that can be taken are generally determined by the recording resolution of an image forming apparatus, the screen setting that is closest to the above condition is chosen. When a halftone screen with the recording resolution of 600 dots per inch (dpi) or 1200 dpi is used, for example, the setting is mainly as follows.

C plane 190L (18 degrees)
M plane 190L (72 degrees)
Y plane 200L (0 degree)
K plane 212L (45 degrees).

FIGS. 2A and 2B are explanatory diagrams of a halftone screen 51 and a line screen 52 with a screen angle θ of 18 degrees according to the conventional technique. As there are two screen angles between 0 degree and 180 degree for a halftone screen, the screen angle is expressed by an angle of 0 degree or greater and less than 90 degree in the angle range, whereas the screen angle is expressed by an angle of 0 degree or greater and less than 180 degree for a line screen.

However, when forming an image with a dark toner and a light toner (or dark ink and light ink) of five colors for the K plane (hereinafter, the dark K plane is referred to as "Bk plane" while the light K plane is referred to as "Lk plane"), it is necessary to consider a moire phenomenon generated by overlapping of the screens of the Bk plane and the Lk plane, and also a moire generated by the Bk plane and another color plane and a moire generated by the Lk plane and another color plane.

When, for example, the CMYK planes are set to CMYBk planes and the halftone screen of the Lk plane is arranged between the C plane and the Bk plane, for 1200 dpi, a halftone screen of 206L (31 degrees) can be set. Here, the screen frequencies of the Bk plane and the Lk plane are almost the same and there is an angle difference of 14 degrees; therefore a moire is generated when the two planes overlap each other. That is, for each of the individual planes of five colors, it is necessary to determine the desirable screen setting to prevent a moire generated by overlapping of individual planes.

FIG. 3 is an explanatory diagram of an example where a moire is generated by overlapping of planes for the screen for the Bk plane set to 212L (45 degrees) and the screen for the Lk plane set to 206L (31 degrees). With the setting as shown in FIG. 3, overlapping of the Bk plane and the Lk plane generates a moire on the screen.

SUMMARY OF THE INVENTION

An image forming apparatus, image forming method, and computer product is described. In one embodiment, the image forming apparatus comprises an image processor that performs image processing with periodic dot layouts of cyan, magenta, yellow, black, and light black converted from RGB image data to form an image, wherein the image processor performs image processing using frequencies and angles of the dot layouts that are set to a first setting which reduces a moire phenomenon caused by overlapping of the black and the light black.

BRIEF DESCRIPTION OF THE DRAWINGS

FIG. 7 is an example of a hardware configuration of the image forming apparatus according to the embodiment.

DETAILED DESCRIPTION

Embodiments of the present invention provide a technology that enables formation of a moire-free screen.

An image forming apparatus according to an embodiment of the present invention includes an image processor that performs image processing with periodic dot layouts of cyan, magenta, yellow, black, and light black converted from RGB image data to form an image. The image processor performs image processing using frequencies and angles of the dot layouts that are set to a first setting which reduces a moire phenomenon caused by overlapping of the black and the light black.

A method of forming image according to another embodiment of the present invention includes performing image processing with periodic dot layouts of cyan, magenta, yellow, black, and light black converted from RGB image data to form an image by using frequencies and angles of the dot layouts that are set to a first setting which reduces a moire phenomenon caused by overlapping of the black and the light black.

A computer readable recording medium according to still another aspect of the present invention stores a computer program that implements the above method on a computer.

The other embodiments, features, and advantages of the present invention are specifically set forth in or will become apparent from the following detailed description of the invention when read in conjunction with the accompanying drawings.

Exemplary embodiments according to the present invention will be explained in detail with reference to the accompanying drawings.

Figure 1:
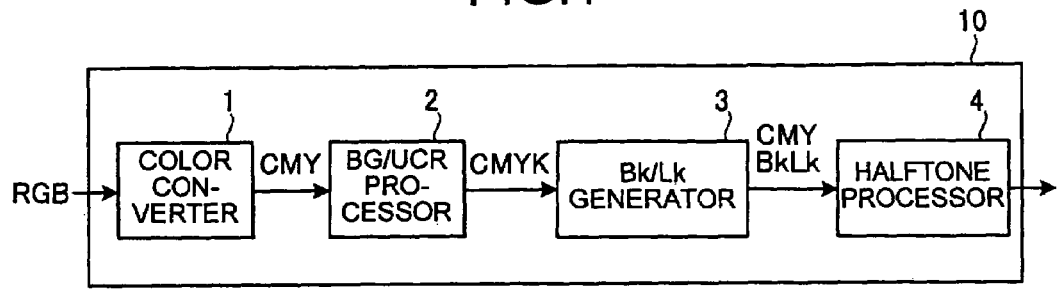
FIG. 1 is a functional block diagram of an image forming apparatus according to an embodiment of the present invention.
Figure 2A:
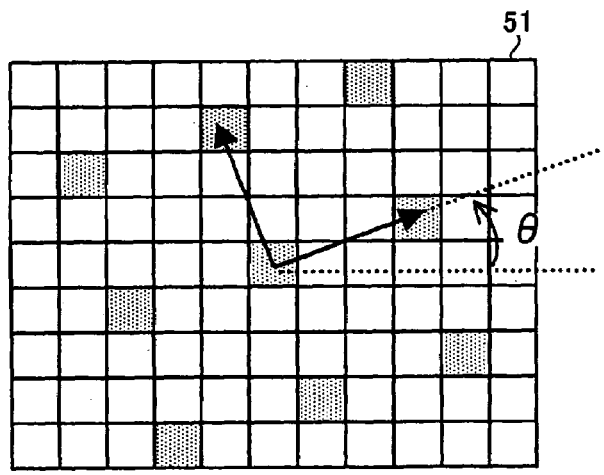
FIGS. 2A and 2B are explanatory diagrams of a halftone screen and a line screen with a screen angle of 18 degrees according to a conventional technique.
Figure 2B:
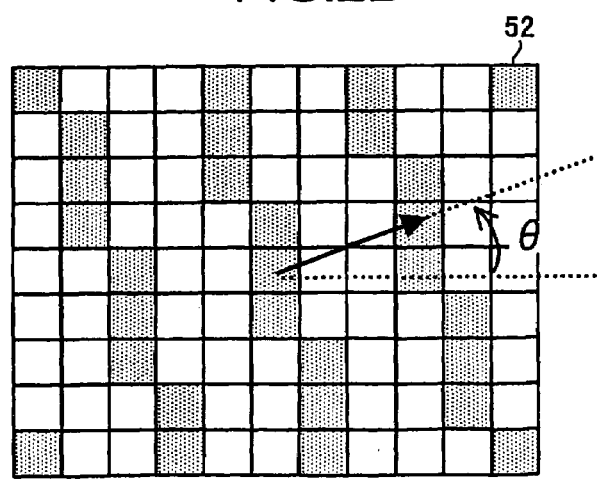

FIG. 1 is a functional block diagram of an image forming apparatus 10 according to an embodiment of the present invention. The image forming apparatus 10 includes a color converter 1, a BG/UCR (Black Generation/Under Color Removal) processor 2, a Bk/Lk (Dark Black/Light Black) generator 3, and a halftone processor 4.

An RGB image data is input into the color converter 1. The color converter 1 converts the image data to CMY (Cyan, Magenta, and Yellow) data. The CMY data undergoes black generation and under color removal in the BG/UCR processor 2, thus yielding CMYK data. The K (black) data is separated into Bk (dark black) data and Lk (light black) data, providing data of five colors each of which is subjected to halftone processing by the halftone processor 4.

Since a general 4-color printer technology is applicable to color conversion from RGB to CMY and the BG/UCR processing, any known conventional technique can be applied for the Bk/Lk generation. For example, the technique disclosed in Japanese Patent Application Laid-Open No. H8-171252 can be applied to the Bk/Lk generation.

In the halftone processing, the ON/OFF of a dot is determined by a dither process for each plane, and a halftone screen or a line screen is formed by the ON/OFF of dots. Besides the dither process, a process of forming an image that has a certain periodicity, not a complete screen, such as an error diffusion process using a dither threshold, can be adapted. The screen frequency and the angle of each plane are explained below.

One example of a screen setting using a halftone screen for each plane is explained below as a first embodiment. The screen setting is determined beforehand, and in actual processing, the halftone processor 4 shown in FIG. 1, which has a memory (not shown) that stores a dither matrix generated based on the screen settings, reads the dither matrix from the memory and quantizes data using the dither matrix.

| C plane  | 190L (18 degrees) | halftone screen |
| M plane  | 190L (72 degrees) | halftone screen |
| Y plane  | 212L (45 degrees) | halftone screen |
| Bk plane | 212L (45 degrees) | halftone screen |
| Lk plane | 200L (0 degree)   | halftone screen |

Table 1 presents a list of angle differences and frequency ratios of light black and other colors and shows angle differences and frequency ratios of the Bk plane, the C plane, and the M plane, and the Lk plane. The frequency ratio is the ratio of the higher one of the frequencies of colors to be compared to the lower one.

TABLE 1

|       | Angle Difference | Frequency Ratio |
|-------|------------------|-----------------|
| Bk-Lk | 45°              | 1.06            |
| C-Lk  | 18°              | 1.05            |
| M-Lk  | 18°              | 1.05            |

Figure 3:
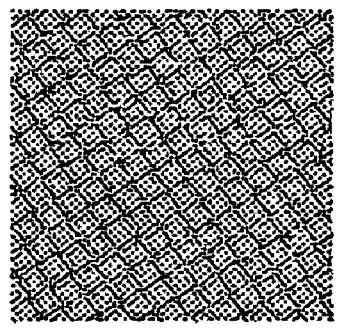
FIG. 3 is an explanatory diagram of an example where a moire is generated by overlapping of planes for the screen for a Bk plane set to 212L (45 degrees) and the screen for a Lk plane set to 206L (31 degrees)
Figure 4:
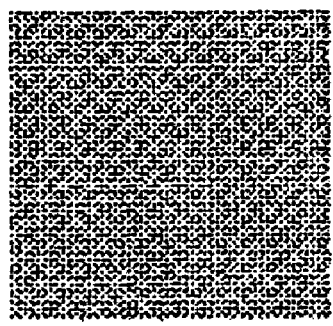
FIG. 4 is an explanatory diagram of suppression of generation of a moire originating from overlapping of planes for the screen for the Bk plane set to 212L (45 degrees) and the screen for the Lk plane set to 200L (0 degree)

FIG. 4 is an explanatory diagram of suppression of generation of a moire originating from the overlapping of the planes for the screen for the Bk plane set to 212L (45 degrees) and the screen for the Lk plane set to 200L (0 degree). It is apparent from FIG. 4 that the setting of the dither matrix according to the first embodiment has suppressed generation of a moire as compared with the example shown in FIG. 3. In the first embodiment, the Bk plane and the Lk plane have substantially the same frequency ratio (1.06) and an angle difference of 45 degrees. A moire phenomenon originating from the overlapping of two planes having such a relationship is hard to observe and it can be almost said that a moire phenomenon does not occur.

The C plane and the M plane have substantially the same frequency ratios (1.05) and both have angle differences of 18 degrees with respect to the Lk plane. Overlapping of the two planes i.e., the Lk plane and the C plane or the M plane, having such a relationship generates a moire, which is less apparent than the moire that is originated from overlapping of the Lk plane and the Bk plane, and the intensity of the moire is lower so that the moire is relatively hard to observe.

Since a moire, when generated by overlapping of the Bk plane and the Lk plane, is very easily observed, the first setting condition is determined so as to suppress generation of a moire originating from overlapping of those two planes, and the screens for the individual planes are set in such a way as to suppress moires originating from the Lk plane and the C plane and the M plane as much as possible (The present embodiment is one embodiment of the fourth aspect).

It is assumed that the color material density of the Y plane is lower (less observable) than the color material density of the Lk plane. In such a case, as described in the embodiment, the screen setting for the Y plane is different from those of the other four planes. For example, the screen settings for the four planes excluding the Y plane are set by priority and the screen setting for the Y plane is set to the same screen setting as that for the Bk plane, less likely to be used together, or specifically to 166L (34 degrees). Explanation of the Y plane is omitted in the following embodiments.

By setting the halftone screens of the individual planes in the above manner, generation of a moire can be effectively suppressed when an image is formed in five colors using halftone screens.

Another example of the screen setting when using a halftone screen for each plane is explained below as a second embodiment. Although the frequencies of the halftone screens of the individual planes are substantially the same in the first embodiment, an image can be formed with a screen of a lower frequency for the Lk plane because the Lk plane is less observable than the Bk plane. The settings of the halftone screens for the individual planes in such a case are as follows.

| C plane | 190L (18 degrees) | halftone screen |
| M plane | 190L (72 degrees) | halftone screen |
| Y plane | 200L (0 degree) | halftone screen |
| Bk plane | 212L (45 degrees) | halftone screen |
| Lk plane | 126L (18 degrees) | halftone screen |

Table 2 presents a list of angle differences and frequency ratios of light black and other colors. The Bk plane and the Lk plane have a frequency ratio of 1.68 and an angle difference of 27 degrees. Overlapping of two planes having such a relationship does not generate a moire.

TABLE 2

|  | Angle Difference | Frequency Ratio |
|---|---|---|
| Bk-Lk | 27° | 1.68 |
| C-Lk | 0° | 1.51 |
| M-Lk | 36° | 1.51 |

Figure 5:
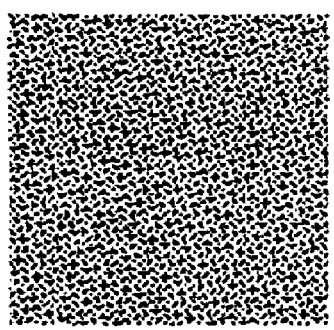
FIG. 5 is another explanatory diagram of suppression of generation of a moire originating from the overlapping of the planes for the screen for the Bk plane set to 212L (45 degrees) and the screen for the Lk plane set to 126L (18 degrees)

FIG. 5 is an explanatory diagram of suppression of generation of a moire originating from the overlapping of the planes for the screen for the Bk plane set to 212L (45 degrees) and the screen for the Lk plane set to 126L (18 degrees). It is apparent from FIG. 5 that the setting of the dither matrix according to a second embodiment has suppressed generation of a moire as compared with the example shown in FIG. 3. In the second embodiment, the Lk plane and the M plane have a frequency ratio of 1.51 and an angle difference of 36 degrees. As the Lk plane has angles of 18 degrees and 108 degrees, there is an angle difference of 108 degrees−72 degrees=36 degrees. The Lk plane and the C plane have a frequency ratio of 1.51 and an angle difference of 0 degree. With overlapping of two planes having such a relationship, a generated moire has a very low intensity, which can be said to be hardly observable.

Therefore, the above halftone screen setting can suppress a moire when an image is formed in five colors.

An example when line screens are used for the Bk plane and the Lk plane and halftone screens are used for the C, M, and Y planes is explained below as a third embodiment. The screen settings for the individual planes in this case are as follows.

| C plane | 190L (18 degrees) | halftone screen |
| M plane | 190L (72 degrees) | halftone screen |
| Y plane | 200L (0 degree) | halftone screen |
| Bk plane | 212L (135 degrees) | line screen |
| Lk plane | 212L (45 degrees) | line screen |

Table 3 presents a list of angle differences and frequency ratios of light black and other colors. The Bk plane and the Lk plane have the same frequency and an angle difference of 90 degree. Overlapping of two planes having such a relationship does not generate a moire.

TABLE 3

|  | Angle Difference | Frequency Ratio |
|---|---|---|
| Bk-Lk | 90° | 1 |
| C-Lk | 27° | 1.12 |
| M-Lk | 27° | 1.12 |

The Lk plane, and the C plane and the M plane have frequency ratios of 1.12 and angle differences of 27 degrees, and overlapping of these planes does not generate a moire either. The present embodiment is one embodiment of the sixth and the seventh aspects.

Therefore, the use of line screens orthogonal to each other only for the Bk plane and the Lk plane can suppress a moire when an image is formed in five colors.

An example when line screens are used for all the planes is explained as a fourth embodiment. The screen settings for the individual planes in this case are as follows.

| C plane | 200L (0 degree) | line screen |
| M plane | 200L (90 degree) | line screen |
| Y plane | 190L (18 degrees) | line screen |
| Bk plane | 212L (135 degrees) | line screen |
| Lk plane | 212L (45 degrees) | line screen |

The C plane, the M plane, the Bk plane, and the Lk plane are arranged at angle differences of 45 degrees, and their screen frequencies are almost identical. Further, the Bk plane and the Lk plane are arranged at angle differences of 90 degree. Therefore, overlapping of the Bk plane and the Lk plane does not generate a moire. Overlapping of the Lk plane and the C (or M) plane does not generate a moire either.

Therefore, the above line screen settings for the individual planes can suppress a moire when an image is formed in five colors.

Figure 6:
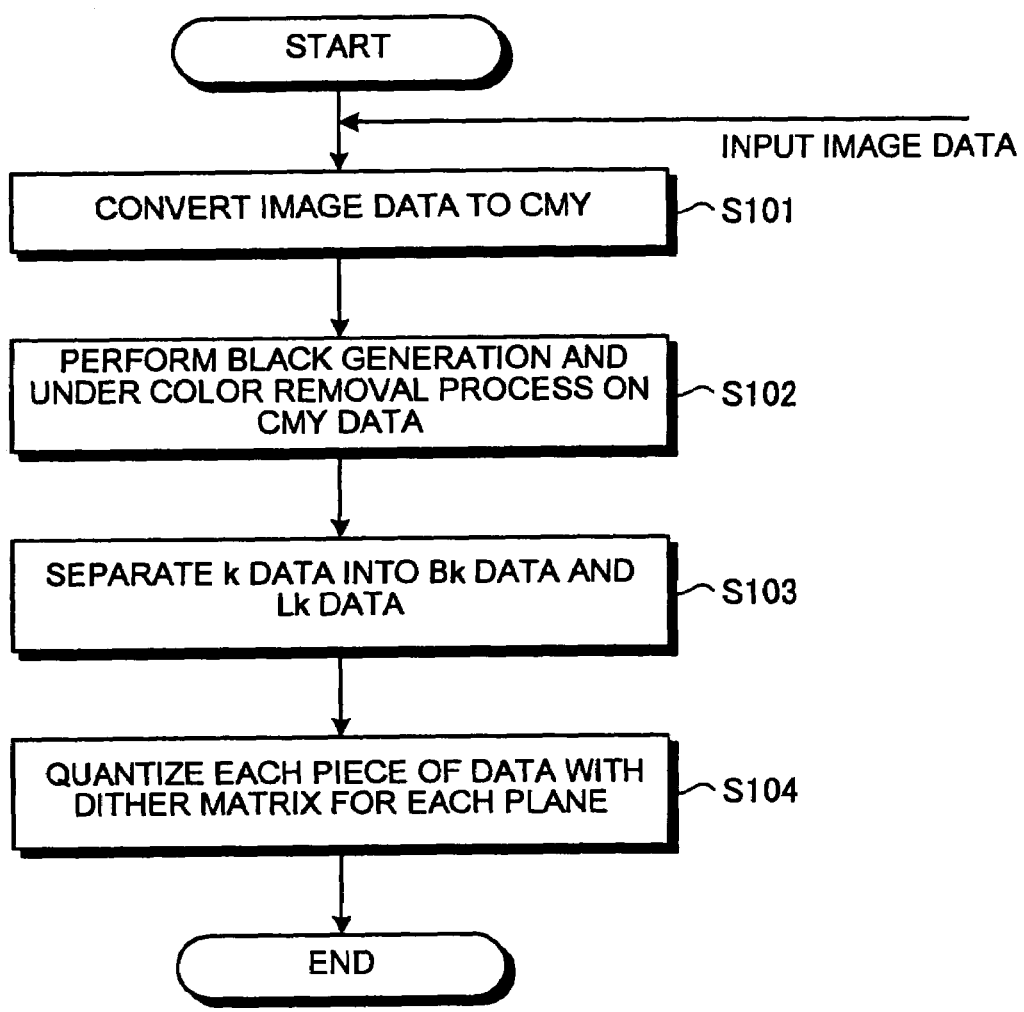
FIG. 6 is a flowchart for illustrating an image processing procedure according to the embodiment.

FIG. 6 is a flowchart for illustrating an image processing procedure according to the embodiments. When RGB image data is input through scanning of a document, the color converter 1 converts the input image data to CMY data (step S101). The BG/UCR processor 2 performs black generation and under color removal on the converted CMY data (step S102). The Bk/Lk generator 3 separates the K data in the CMYK data yielded from the process performed by the BG/UCR processor 2 to Bk (dark black) data and Lk (light black) data (step S103).

The halftone processor 4 reads a dither matrix from the memory where the dither matrix generated based on the screen settings are stored beforehand, and quantizes each piece of data in the CMYK data undergone the process in the Bk/Lk generator 3 for each plane (step S104).

The dither matrix to be read is, for example, the one set in the first embodiment. The dither matrix may be any of those set in the second, the third, and the fourth embodiments.

The image forming apparatus according to the embodiments of the present invention can suppress occurrence of a moire phenomenon in the formation of an image with periodic dots.

FIG. 7 is an example of the hardware configuration of the image forming apparatus according to the embodiments. The image forming apparatus can be realized as a computer system, such as a personal computer or a workstation, by running a program prepared beforehand. A computer 200 is generally controlled by a central processing unit (CPU) 201 to which a read only memory (ROM) 202, a random access memory (RAM) 203, a hard disk drive (HDD) 204, a graphics processor 205, and an input interface 206 are connected by a bus 207. The program of an operating system (OS) and an application program, which are to be executed by the CPU 201, are at least partially stored in the ROM 202 and the RAM 203. Various kinds of data necessary for processing by the CPU 201 are stored in the RAM 203. The OS, various driver programs, an application program, detected data, and the like are stored in the HDD 204.

The graphics processor 205, the input interface 206, and an image forming unit 214 are connected to the bus 207. A monitor 211 is connected to the graphics processor 205. The graphics processor 205 displays an image on the screen of the monitor 211 in response to a command from the CPU 201. A keyboard 212 and a mouse 213 are connected to the input interface 206. The input interface 206 transmits signals sent from the keyboard 212 and the mouse 213 to the CPU 201 via the bus 207. The image forming unit 214 forms an image.

The processing functions of the embodiments can be achieved by the above hardware configuration. To implement the embodiments on the computer 200, driver programs are installed on the computer 200.

The image processing program executed by the image processing apparatus in the embodiment is recorded on a computer readable recording medium such as a CD-ROM, a floppy (registered trademark) disk, or a digital versatile disk (DVD), in a file in an installable format or an executable format, and provided.

The image processing program in the embodiments may be provided and distributed by storing the program on a computer connected to a network such as the Internet and having the program downloaded via the network.

The image forming apparatus according to embodiments of the present invention can suppress occurrence of a moire phenomenon caused by overlapping of the black and the light black when an image is formed by periodic dot layouts of cyan, magenta, yellow, black, and light black.

The image forming apparatus according to embodiments of the present invention can suppress a moire originating from the overlapping of the black and the light black, and suppress the moire originating from the overlapping of the light black and the cyan or the magenta to the minimum.

Since the image forming apparatus according to an embodiment of the present invention performs screen setting such that the light black plane or the yellow plane having a higher color material density has priority, the apparatus can suppress occurrence of a moire phenomenon.

The image forming apparatus according to an embodiment of the present invention can suppress a moire when a halftone screen is used for each color.

The image forming apparatus according to an embodiment of the present invention can suppress a moire originating from the overlapping of the black and the light black when a line screen is used for the black and the light black.

The image forming apparatus according to an embodiment of the present invention can suppress a moire originating from the overlapping of the individual colors when a line screen is used for the black and the light black and a halftone screen is used for the cyan and the magenta.

The image forming apparatus according to an embodiment of the present invention can suppress a moire when a line screen is used for each color.

The image forming method according to an embodiment of the present invention can suppress occurrence of a moire phenomenon caused by overlapping of the black and the light black when an image is formed by periodic dot layouts of cyan, magenta, yellow, black, and light black.

The computer program according to the present invention can make a computer execute the image forming method according to any one of the ninth to the sixteenth aspects of the present invention.

The computer-readable recording medium according to the present invention records the computer program according to the seventeenth aspect.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
an image processor to perform image processing with periodic dot layouts of cyan, magenta, yellow, black, and light black converted from RGB image data to form an image, wherein
the image processor performs image processing using frequencies and angles of the dot layouts that are set to a first setting that reduces a moire phenomenon caused by overlapping of the black and the light black,
the image processor performs image processing using frequencies and angles of the dot layouts that are set to a second setting that reduces a moire phenomenon caused by overlapping of the light black and the cyan, and a moire phenomenon caused by overlapping of the light black and the magenta,
the first setting having a higher priority than the second setting, and
further wherein the image processor sets the yellow to reduce a moire phenomenon caused by overlapping of the yellow with the cyan, the magenta, the black, and the light black.

2. The image forming apparatus according to claim 1, wherein the image processor performs image processing using the frequencies and the angles of the dot layouts that are set to the second setting only when a color material density of the light black is greater than a color material density of the yellow.

3. The image forming apparatus according to claim 1, wherein the image processor performs image processing using frequencies and angles of the dot layouts such that
the cyan, the black, and the magenta are halftone screens having equal frequencies and angle differences therebetween each set at approximately 30 degree;
the light black is a halftone screen; and
the light black and the black have a frequency ratio of 1.0 to 1.2, which is a ratio of a higher one of the frequencies of the light black and the black to a lower one thereof, and have the angle difference of approximately 45 degrees.

4. The image forming apparatus according to claim 1, wherein the image processor performs image processing using frequencies and angles of the dot layouts such that
the cyan, the black, and the magenta are halftone screens having equal frequencies and angle differences therebetween each set at approximately 30 degree;
the light black is a halftone screen; and
the light black and the black have a frequency ratio of 1.5 to 1.7, which is a ratio of a higher one of the frequencies of the light black and the black to a lower one thereof, and have the angle difference of approximately 30 degree.

5. The image forming apparatus according to claim 1, wherein the image processor performs image processing using frequencies and angles of the dot layouts such that the black and the light black are line screens having an angle difference of approximately 90 degree.

6. The image forming apparatus according to claim 5, wherein the image processor performs image processing using frequencies and angles of the dot layouts such that
the cyan and the magenta are halftone screens;
a frequency ratio of the cyan and the black is equal to a frequency ratio of the magenta and the black; and
each of angle differences of the cyan and the magenta with respect to the light black is approximately ±30 degree.

7. The image forming apparatus according to claim 5, wherein the image processor performs image processing using frequencies and angles of the dot layouts such that
the cyan and the magenta are line screens;
a frequency ratio of the cyan and the black is equal to a frequency ratio of the magenta and the black; and
each of angle differences of the cyan and the magenta with respect to the black is approximately ±45 degrees.

8. A method of forming image applied to an image forming apparatus which forms an image using toners or inks of colors, the method comprising:
performing image processing with periodic dot layouts of cyan, magenta, yellow, black, and light black converted from RGB image data to form an image, using an image forming apparatus which forms an image using toners or inks of colors, by using frequencies and angles of the dot layouts that are set to a first setting that reduces a moire phenomenon caused by overlapping of the black and the light black,
wherein the image processing is performed by using frequencies and angles of the dot layouts that are set to a second setting that reduces a moire phenomenon caused by overlapping of the light black and the cyan, and a moire phenomenon caused by overlapping of the light black and the magenta, the first setting having a higher priority than the second setting, and
further including setting the yellow to reduce a moire phenomenon caused by overlapping of the yellow and the cyan, the magenta, the black, and the light black.

9. The method according to claim 8, wherein the image processing is performed by using the frequencies and the angles of the dot layouts that are set to the second setting only when a color material density of the light black is greater than a color material density of the yellow.

10. The method according to claim 8, wherein the image processing is performed by using frequencies and angles of the dot layouts such that
the cyan, the black, and the magenta are halftone screens having equal frequencies and angle differences therebetween each set at approximately 30 degree;
the light black is a halftone screen; and
the light black and the black have a frequency ratio of 1.0 to 1.2, which is a ratio of a higher one of the frequencies of the light black and the black to a lower one thereof, and have the angle difference of approximately 45 degrees.

11. The method according to claim 8, wherein the image processing is performed using frequencies and angles of the dot layouts such that
the cyan, the black, and the magenta are halftone screens having equal frequencies and angle differences therebetween each set at approximately 30 degree;
the light black is a halftone screen; and
the light black and the black have a frequency ratio of 1.5 to 1.7, which is a ratio of a higher one of the frequencies of the light black and the black to a lower one thereof, and have the angle difference of approximately 30 degree.

12. The method according to claim 8, wherein the image processing is performed by using frequencies and angles of the dot layouts such that the black and the light black are line screens having an angle difference of approximately 90 degree.

13. The method according to claim 12, wherein the image processor performs image processing using frequencies and angles of the dot layouts such that
the cyan and the magenta are halftone screens;
a frequency ratio of the cyan and the black is equal to a frequency ratio of the magenta and the black; and
each of angle differences of the cyan and the magenta with respect to the light black is approximately ±30 degree.

14. The method according to claim 12, wherein the image processor performs image processing using frequencies and angles of the dot layouts such that
the cyan and the magenta are line screens;
a frequency ratio of the cyan and the black is equal to a frequency ratio of the magenta and the black; and
each of angle differences of the cyan and the magenta with respect to the black is approximately ±45 degrees.

15. A computer readable recording medium that stores a computer program that causes a computer to perform a method comprising:
performing image processing with periodic dot layouts of cyan, magenta, yellow, black, and light black converted from RGB image data to form an image by using frequencies and angles of the dot layouts that are set to a first setting which reduces a moire phenomenon caused by overlapping of the black and the light black,
wherein the image processing is performed by using frequencies and angles of the dot layouts that are set to a second setting that reduces a moire phenomenon caused by overlapping of the light black and the cyan, and a moire phenomenon caused by overlapping of the light black and the magenta, the first setting having a higher priority than the second setting, and
further comprising setting the yellow to reduce a moire phenomenon caused by overlapping of the yellow and the cyan, the magenta, the black, and the light black.

* * * * *